Patented Mar. 5, 1929.

1,704,304

UNITED STATES PATENT OFFICE.

HELENE SESSLER, OF MANNHEIM, GERMANY, ASSIGNOR TO C. F. BOEHRINGER & SOEHNE G. M. B. H., OF MANNHEIM-WALDHOF, GERMANY.

PROCESS OF MAKING CELLULOSE ETHERS.

No Drawing. Application filed February 6, 1926, Serial No. 86,657, and in Germany February 20, 1925.

This invention relates to the art of manufacturing cellulose ethers from cellulose materials, such as cellulose proper, its conversion products and derivatives, its object being to produce such ethers in a manner adapted for commercial production and without changing the fibrous structure of the cellulose material.

It is well known that, in contradistinction from the manufacture of cellulose-esters, the preparation of the ethers of cellulose offers many difficulties if it is desired to obtain industrially valuable products. The difficulties which present themselves in this connection relate to the properties of the products obtained, on the one hand, and on the other to the costs of and the complications arising in the processes hitherto employed. Thus it has heretofore not been possible to obtain alkyl-derivatives of cellulose in which the structure of the fibre was maintained, whereby alone the certainty that the cellulose molecule has not been disintegrated is secured, and a product is obtained which will form a clear and homogeneous solution in the usual organic solvents, and which will be adapted for the manufacture of films, plastic masses, for example, as are the cellulose-esters. This is mainly due to the fact that under the known processes either a destruction of the fibrous form, by grinding, dissolving or otherwise, is held to be necessary, or that a structural modification, often resulting in a complete disintegration, is caused by high temperatures, extreme concentration of the alkalies employed, or the injurious action on cellulose by repeated treatment with alkalies and alkylizing reagents. From an economical point of view the known processes of preparing cellulose ethers do not answer the requirements for the manufacture of an industrially useful product, which have long ago been satisfied in the manufacture of other cellulose derivatives. Thus most of the known processes for obtaining products of this character which are soluble in organic solvents necessitate the repetition of the alkylizing reaction several times; others require so great an excess of highly concentrated alkali that considerable amounts of the alkylizer are used to no purpose and wasted, the surplus of alkylizing agent not entering into the reaction being recovered only by complex methods, because it must first be separated from the solvents which are simultaneously present. Finally, the disadvantage of working with solvents is not confined to the time-wasting and wasteful removal and expulsion of the solvents, but resides essentially in the fact that, in order to obtain a stable product, it is indispensably necessary to wash the resultant alkyl-cellulose, which has been precipitated from the solution or which presents a destroyed fibre-structure, due to the reaction, to neutral reaction. This treatment is much more difficult and tedious than where the product can be obtained in the original fibrous form.

All these drawbacks can be eliminated when proceeding according to this invention, which consists in subjecting the product obtained by treating cellulose or a conversion product or derivative of cellulose with mercerizing solution or bath to streams of a vaporized ether-forming substance. This treatment may be carried out under reduced pressure, more specifically, below atmospheric pressure, under given circumstances in order to reduce the temperature of the boiling point of the ether-forming substance below 150°, centigrade, and in rotation or circulation. The vapor of the ether-forming substance may be used alone or mixed with diluting gases or vapors. This manner of treatment makes it possible to work at temperatures at which alkalicellulose is not modified in structure by the alkalizing reagents. The absence in this treatment of solvents of the raw material and the fact that injurious temperatures may be avoided insure the preservation of the original fibrous form of the product during all the stages of the process. The alkyl-cellulose so obtained may be rapidly rendered perfectly neutral by washing with hot water and, after being dried, dissolved in the usual organic solvents without leaving any residue or unconverted portions. The remainder of the alkylizing agent which has not entered into the conversion of the alkalicellulose may be recovered by condensation and, by returning the same to the distilling apparatus, may be rendered available for alkylizing further quantities of starting material.

The following examples embodying the preferred method of carrying out my invention are given to present a full disclosure of my invention.

*Example.*

Ten grams of cotton cellulose are submitted to the action of a mercerizing solution by immersing the same in a bath of the solution of 20 per cent strength and the resultant product is exposed in a vacuum of about 10 millimeters Hg to a stream of dimethylsulfate vapors, the dimethyl-sulfate boiling at about 70° centigrade. The distillation of the sulfate is continued for two and one-half hours. The product resulting from this process is a dimethyl-cellulose in which the fibre structure has been preserved and which dissolves uniformly in the organic solvents such as ethylene-chlorhydrin, methylene-chlorid and the like without leaving insoluble residues.

Let it be noted that in the following claims the term "in the presence of a basic substance" is to be taken without reference to whether such basic substance enters into a chemical union or an addition product with the cellulose or is present in a partly or entirely unbound state, and the term "cellulose" is to be taken in the broad sense and to include also mercerized cellulose and conversion products and derivatives of cellulose.

What I claim and desire to secure by Letters Patent is:

1. The process which consists in subjecting cellulose to the action of a vapor-stream of an ether-forming reagent in the presence of a basic substance.

2. The process which consists in subjecting cellulose to the action of a vapor-stream of an ether-forming reagent in the presence of a basic substance, below atmospheric pressure.

3. The process which consists in subjecting cellulose to the action of a vapor-stream of an ether-forming reagent, mixed with a diluting gas in the presence of a basic substance.

4. The process which consists in subjecting cellulose to the action of a vapor-stream of an ether-forming reagent, mixed with a diluting gas in the presence of a basic substance below atmospheric pressure.

5. The process which consists in subjecting cellulose to the action of a vapor-stream of an alkylizing reagent in the presence of a basic substance.

6. The process which consists in subjecting cellulose to the action of a vapor-stream of an alkylizing reagent in the presence of a basic substance below atmospheric pressure.

7. The process which consists in subjecting cellulose to the action of a vapor-stream of an alkylizing reagent, mixed with a diluting gas in the presence of a basic substance.

8. The process which consists in subjecting cellulose to the action of a vapor-stream of an alkylizing reagent, mixed with a diluting gas in the presence of a basic substance below atmospheric pressure.

9. The process which consists in subjecting cellulose to the action of a vapor-stream of dimethyl-sulfate in the presence of a basic substance.

10. The process which consists in subjecting cellulose to the action of a vapor-stream of dimethyl-sulfate in the presence of a basic substance below atmospheric pressure.

11. The process which consists in subjecting cellulose to the action of a vapor-stream of dimethyl-sulfate mixed with a diluting gas in the presence of a basic substance.

12. The process which consists in subjecting cellulose to the action of a vapor-stream of dimethyl-sulfate mixed with a diluting gas in the presence of a basic substance below atmospheric pressure.

13. The process which consists in subjecting cellulose moistened with a mercerizing solution to a vapor of an ether-forming reagent.

14. The process which consists in subjecting cellulose moistened with a mercerizing solution to a vapor of an alkylizing reagent.

15. The process which consists in subjecting cellulose moistened with a mercerizing solution to a vapor stream of dimethylsulfate.

16. The process which consists in subjecting cellulose treated with a mercerizing bath to a vapor-stream of an ether-forming reagent.

17. The process which consists in subjecting cellulose treated with a mercerizing solution to a vapor-stream of an alkylizing reagent in a vacuum.

18. The process which consists in subjecting cellulose to the action of an alkaline reagent and submitting the resultant product to a vapor-stream of an ether-forming reagent.

19. The process which consists in subjecting cellulose to the action of an alkaline reagent and submitting the resultant product to a vapor-stream of an ether-forming reagent below atmospheric pressure.

20. The process which consists in subjecting cellulose to the action of an alkaline reagent and submitting the same to a vapor-stream of an alkylizing reagent.

21. The process which consists in subjecting cellulose to the action of an alkaline reagent and submitting the same to a vapor-stream of an alkylizing reagent below atmospheric pressure.

22. The process which consists in subjecting cellulose to the action of an alkaline reagent and submitting the same to a vapor-stream of dimethyl-sulfate.

23. The process which consists in subjecting cellulose to the action of an alkaline reagent and submitting the same to a vapor-stream of dimethyl-sulfate below atmospheric pressure.

In testimony whereof I hereunto affix my signature.

HELENE SESSLER.